United States Patent [19]

Palmer

[11] Patent Number: 5,507,501
[45] Date of Patent: Apr. 16, 1996

[54] SEALING DISC USED IN HYDRAULIC TESTING OF PLUMBING SYSTEM

[76] Inventor: Dennis D. Palmer, 491 Aspen La., Park City, Utah 84060

[21] Appl. No.: 297,764

[22] Filed: Aug. 30, 1994

[51] Int. Cl.⁶ .............................. F16J 9/00; G01M 3/08; G01M 3/04
[52] U.S. Cl. ...................... 277/9; 277/DIG. 10; 73/49.1; 73/49.5; 73/49.8; 137/68.11; 138/89
[58] Field of Search .................................... 220/276, 270, 220/265, 266; 137/68.1, 67, 89; 138/90, 92; 73/49.1, 49.5, 49.8, 40.5 R; 277/DIG. 10, 9, 135

[56] References Cited

U.S. PATENT DOCUMENTS

| | | | |
|---|---|---|---|
| 3,635,234 | 1/1972 | Dawson | 137/68 |
| 4,329,857 | 5/1982 | Kittle et al. | 220/229 |
| 4,436,310 | 3/1984 | Sawabe et al. | 277/11 |
| 4,542,642 | 9/1985 | Tagliarino | 138/90 |
| 4,763,510 | 8/1988 | Palmer | 138/94 |
| 4,834,825 | 5/1989 | Adams et al. | 156/294 |
| 4,850,503 | 7/1989 | Larsson | 220/276 |
| 5,033,510 | 7/1991 | Huber | 137/68.1 |
| 5,353,943 | 10/1994 | Hayward | 220/276 |

FOREIGN PATENT DOCUMENTS

| | | | |
|---|---|---|---|
| 520937 | 7/1976 | U.S.S.R. | 137/68.1 |
| 2216063 | 10/1989 | United Kingdom | 220/276 |

Primary Examiner—William A. Cuchlinski, Jr.
Assistant Examiner—Keith Hwang
Attorney, Agent, or Firm—Terry M. Crellin

[57] ABSTRACT

A disc-shaped sealing device for use in temporarily blocking and sealing a plastic fitting in a drain, vent, waste plumbing system is molded as an integral, unitary piece from polymeric material. The sealing device comprises a circular disc and an angled flange extending outwardly and upwardly from the perimeter of the circular disc. The disc-shaped device fits snugly within a barrel of a plastic fitting such that the circular disc is coaxially received in the barrel of the plastic fitting and the angled flange mates with and lies against a bevel in the barrel of the plastic fitting. A lug extends downwardly from the circular disc. First and second elongate grooves are formed in one of the surfaces of the circular disc. These grooves have a common juncture positioned near the forward end of the lug, the grooves diverge and extending along the opposite sides of the lug to near the back end of the lug. The grooves then further extend so that the first groove curves in an arc around the perimeter of the circular disc, and the second groove extends in an arc that is spaced inwardly toward a central portion of the circular disc from the first groove. The disc-shaped device can be ripped out of the barrel of the fitting so as to remove the device in its entirety from the fitting by pulling on the lug and ripping the circular disc along the first and second grooves in a spiral ripping motion that ultimately pulls the circular disc and the angled flange out of the fitting.

20 Claims, 2 Drawing Sheets

SEALING DISC USED IN HYDRAULIC TESTING OF PLUMBING SYSTEM

BACKGROUND OF THE INVENTION

1. Field

The present invention relates to devices which are used to dam or block the drain, vent, waste plumbing systems above the test tee, such that the system can be filled with air or water to hydraulically test the system.

2. State of the Art

When a plumber installs a drain, vent, waste system in either new construction or in remodeling, a test tee is installed in the low point of the drain, vent, waste system. When the drain, vent, waste system is completed, it must be tested hydraulically to insure the absence of leaks in the system. To accomplish the hydraulic test, the plumbing system must be blocked or dammed at the test tee so that the system can be filled with water above the test tee.

Heretofore, it has been common practice to utilize an inflatable rubber or elastomeric device which can be installed through the lateral opening in the tee to block the plumbing system above the tee. Once installed above the lateral opening in the test tee, the block-off device is inflated so as to make a fluid tight seal with the plumbing system at the test tee. Water is then introduced into the plumbing system and allowed to stand in the plumbing system above the test tee to determine if there are any leaks in the system.

Following the test, the inflatable device must be removed to allow the water to drain from the system. The system normally contains a substantial volume of water under a substantial head or pressure. In deflating the damming device, care must be taken to prevent the device from being swept into the drain conduit downstream from the test tee. Otherwise, the device is likely to be caught in the drainage conduit and must then be removed to alleviate the chance of having the damming device being swept deep into the drain conduit, a tether is commonly attached to the device. If the device is swept into the drainage conduit, the tether holds the device close to the test tee and after the water has drained from the plumbing system being tested, the tether is used to withdraw the damming device from the drainage conduit through the test tee.

Unfortunately, it has been the sad experience of many plumbers to have the tether break as the damming device is being swept into the drainage conduit by the head pressure of the water in the system being tested. Alternatively, and just as perplexing, the tether can become entangled with the damming device in the drainage conduit such that even though the tether extends out of the test tee, the damming device cannot be extracted from the drainage conduit.

In my previous U.S. Pat. No. 4,763,510 issued on Aug. 16, 1988, I disclosed a one-piece, molded sealing element that was cup-shaped and fit within a test tee. When installed in a test tee, the cup-shaped element formed a dam so that the drain, vent, waste system could be filled with water to hydraulically test the system. Following the hydraulic test, the sealing element was broken and removed from the test tee in a two step procedure. In the first step, the circular disc portion of the cup-shaped element was broken from the cylindrical sidewall of the cup-shaped element. In the second step, the remaining cylindrical sidewall portion was pried loose from the barrel of the plastic tee and then removed from the side entry of the plastic tee.

It has been found that it would be highly desirable to provide an inexpensive, improved device for blocking or damming the plumbing system at a test tee, with the improved device being adapted to be ripped or torn out of the barrel of the test tee in a simplified procedure in which the device is removed in its entirety from the test tee by ripping the central, portion of the circular disc in a spiral ripping motion that extends to the perimeter portion of the device to rip or pull the entire device from the test tee.

OBJECTS AND SUMMARY OF THE INVENTION

A principal objective of the present invention is to provide an inexpensive, foolproof device which is easily and readily installed in the test tee as the plumbing system is being fabricated, wherein the device blocks or dams the plumbing system above the test tee, and wherein following the test, the device can quickly and easily be removed in its entirety from the plumbing system in a simple, one step procedure in which the device is ripped in a spiral-like motion and pulled from the test tee through the side entry of the test tee.

A particular objective of the present invention is to provide a disc-shaped sealing device molded integrally from a polymeric material, wherein the disc-shaped device is adapted to be installed in the straight through barrel of a plastic test tee.

An additional objective is to provide a disc-shaped device as in the above paragraph comprising a circular disc having an angled flange molded integrally to the perimeter of the circular disc, with the circular disc further having a pair of elongate grooves formed in one of the surfaces thereof, with the grooves being spaced a short distance from each other and extending around the circular disc in a spiral-like configuration, whereby following the hydraulic test of the plumbing system, the disc-shaped device can be quickly and easily ripped from the barrel of the test tee by ripping the circular disc in a spiral ripping motion from the central portion of the circular disc to the perimeter of the device so that the entire device is removed from the test tee.

A further objective is to provide a disc-shaped sealing element of the type as in the above paragraph, wherein a substantially rectangular lug is formed integrally with an extends downwardly from the bottom of the circular disc, whereby the lug can be used to initiate ripping of the circular.

The above objectives are achieved in accordance with the present invention by providing a novel, disc-shaped, sealing device which is molded as an integral, unitary piece from a polymeric material. The sealing device comprises a substantially flat, circular disc that has an angled flange extending outwardly and upwardly from the perimeter of the circular disc. The molded sealing device is adapted to be inserted snugly within the straight through barrel of a plastic test tee so that the sealing device forms a blockage which seals around the barrel of the plastic tee, whereby hydraulic testing of the plumbing system upstream of the test tee can be accomplished. The molded sealing device is inexpensive, easy to use and is completely removed from the plumbing system following the hydraulic testing. The sealing device is quickly and easily ripped from the test tee by ripping the circular disc in a spiral ripping motion from the central portion of the disc to the perimeter of the disc and then through the angled flange at the perimeter of the disc, so that the entire sealing device is removed from the test tee in a single step procedure.

In a preferred embodiment, the molded sealing device comprises a substantially flat, circular disc member which has an angled flange that extends upwardly and outwardly from the perimeter of the circular disc. The disc-shaped sealing device is adapted to fit snugly within the straight through barrel of the plastic tee, with the angled flange mating with and lying flatwise against the bevel in the barrel of the plastic tee.

In use, the disc-shaped, sealing device is lightly glued in place or held in place with wax in the test tee, and the drain, vent, waste system is fabricated above the test tee. To hydraulically test the drain, vent, waste system, the system is filled with water above the test tee. The disc-shaped sealing device blocks and seals the plumbing system at the test tee so that the water remains in the system above the test tee. Following the hydraulic test, the entire sealing device is easily and quickly removed from the test tee by ripping and pulling the circular disc in a spiral ripping motion from within the circular disc to the perimeter of the circular disc and then through the angled flange at the perimeter of the circular disc.

Additional objects and features of the invention will become apparent from the following detailed description taken together with the accompanying drawings.

THE DRAWINGS

DETAILED DESCRIPTION OF THE ILLUSTRATED EMBODIMENTS

Figure 1:
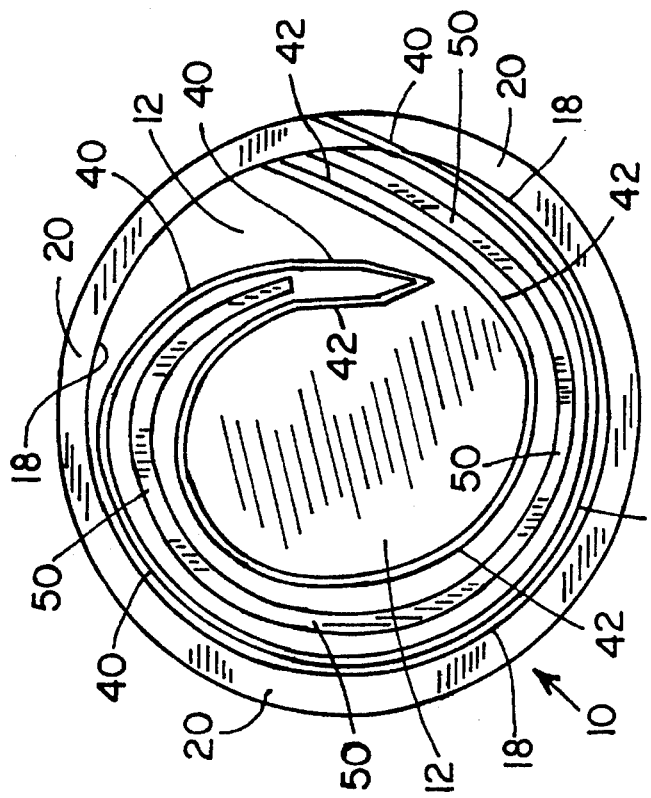
FIG. 1 is a top view of one preferred embodiment of a disc-shaped sealing device in accordance with the present invention.
Figure 3:
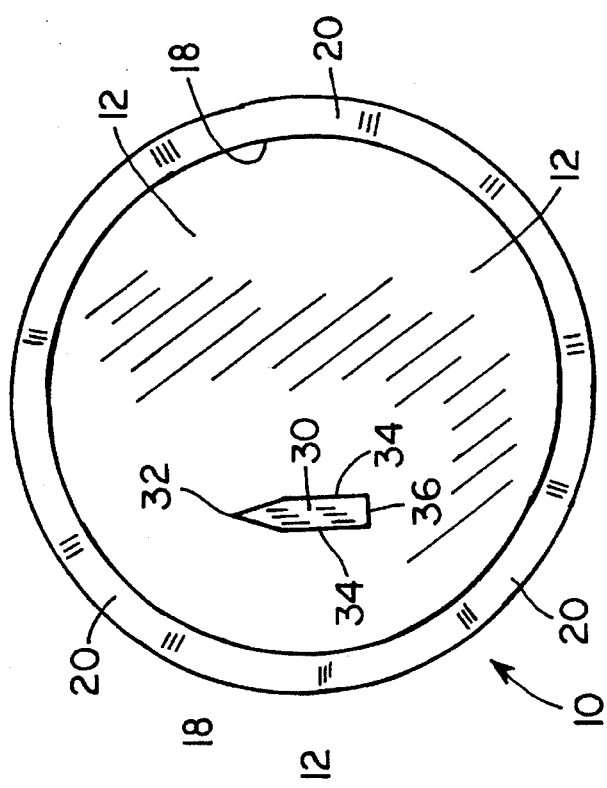
FIG. 3 is a bottom view of the sealing device of FIG. 1.
Figure 5:
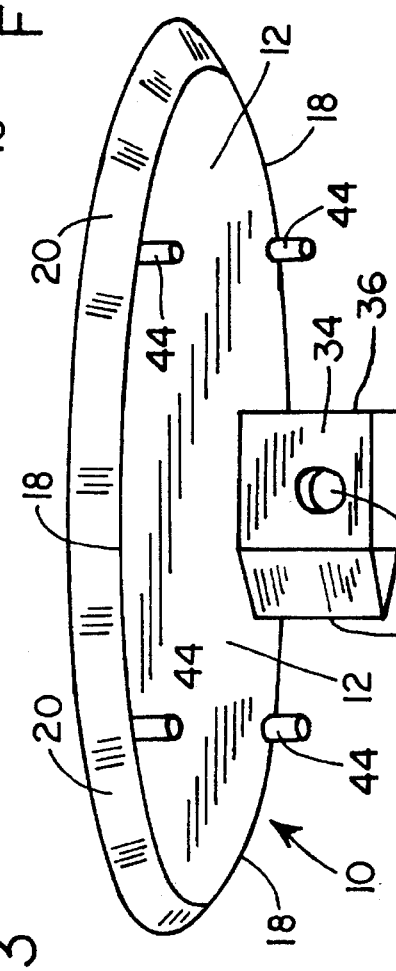
FIG. 5 is a pictorial view looking upwardly at the bottom surface of a modified disc-shaped sealing device that is similar to that of FIG. 1 but has four equally spaced projections that extend downwardly from the bottom surface of the circular disc adjacent to the perimeter of the circular disc.
Figure 6:
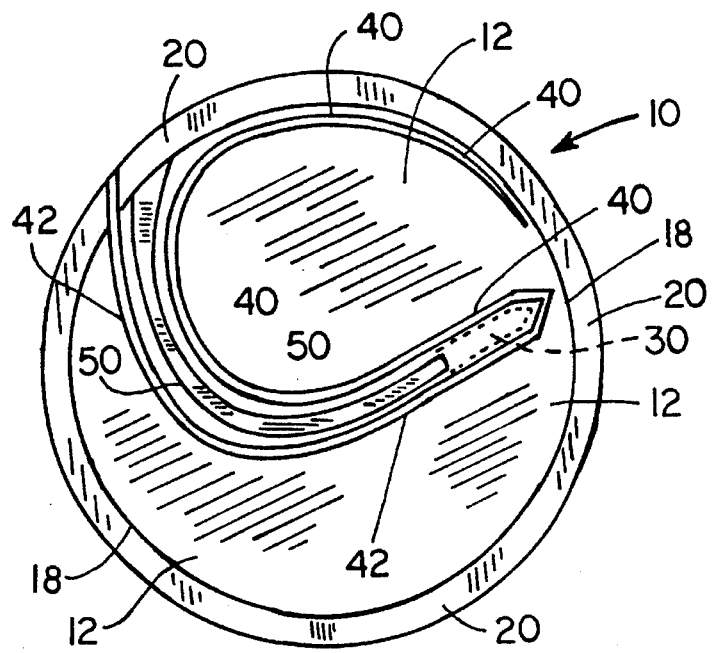
FIG. 6 is a top view of another preferred embodiment of a disc-shaped sealing device.
Figure 2:
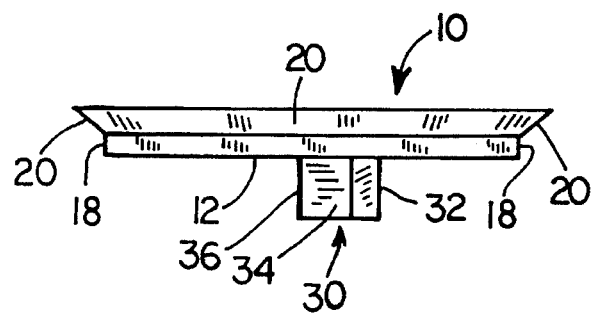
FIG. 2 is a side view of the sealing device of FIG. 1 taken from the right-hand side of FIG. 1.

One preferred embodiment of a disc-shaped sealing device in accordance with the present invention is shown in FIGS. 1–4. Two modified embodiments of the disc-shaped sealing device are shown in FIGS. 5 and 6. Like parts in each of the embodiments will be identified with the same reference numbers in the discussion that follows.

The disc-shaped sealing device 10 is molded as an integral, unitary piece from polymeric material. The sealing device is to be used with a plastic fitting in a drain, vent, waste plumbing system for temporarily sealing the system so that hydraulic testing can be done on the system. The fitting can be a tee, a wye, a closet flange or other common fitting used in drain, vent, waste plumbing systems.

Figure 4:
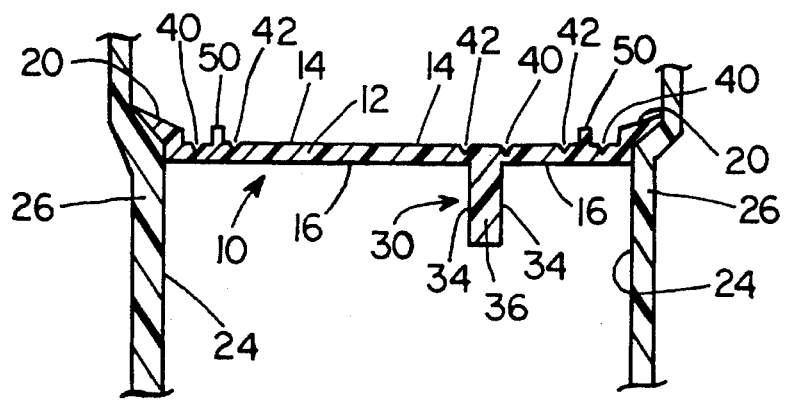
FIG. 4 is a cross section through the sealing device of FIG. 1 taken along line 4—4 of FIG. 1.

The sealing device 10 comprises a circular disc 12 having first and second substantially planar surfaces 14 and 16 (see FIG. 4) and a substantially circular perimeter 18. An angled flange 20 extends outwardly and upwardly from the perimeter 18 of the first surface 14 of the circular disc 12. As shown in FIG. 4, the disc-shaped device 10 is sized to fit snugly within a barrel 24 of a plastic fitting 26, such as a tee, wye or closet flange, such that the angled flange 20 thereof is coaxially received in the barrel 24 of the plastic fitting 26, with the angled flange 26 mating with and lying against a bevel in the barrel 24 of the plastic fitting 26.

A lug 30 extends downwardly from the second surface 16 of the circular disc 12. The lug 30 is preferably substantially rectilinear in shape having a forward end 32, opposite sides 34 and a back end 36 and a bottom. The forward end 32, opposite sides 34 and back end 36 are joined integrally along mutually respective proximal side edges thereof to the circular disc 12. In the illustrated, preferred embodiments, the forward end 32 of the lug 30 is formed by a pair of planar faces that slant forward from the opposite sides 34 of the lug 30 so that the forward end 32 has the general shape of a chisel point. As will be explained hereinafter, the shape of the forward end 32 of the lug 30 aids in initiating a ripping or tearing action that is used in removing the sealing device 10 from the plumbing system after the system has been tested.

As part of the mechanism for ripping or tearing the sealing device 10 from the plumbing system, first and second elongate grooves 40 and 42 are formed in one of the first and second surfaces 14 and 16 of the circular disc 12. The first and second elongate grooves 40 and 42 have a common juncture positioned near the forward end 32 of the lug 30. As illustrated, the common juncture of the grooves 40 and 42 is adjacent to the chisel point of the forward end 32 of the lug 30, with the first and second elongate grooves 40 and 42 diverging from the common juncture and extending along the opposite sides 34 of the lug 30 to a position near the back end 36 of the lug 30. The first and second elongate grooves 40 and 42 then further extending from near the back end 36 of the lug 30 so that the first groove 40 curves in an arc around the perimeter 18 of the circular disc 12 so as to extend at least partially around the perimeter 18 of the circular disc 12 adjacent to the angled flange 20. The second groove 42 extends in an arc that is spaced inwardly toward a central portion of the circular disc 12 from the first groove 40.

In use, the sealing device 10 is placed within the barrel 24 of a fitting 26 as the drain, vent, waste system is being constructed. Usually, the fitting 26 in which the sealing device 10 is placed is located at a lowermost point in the plumbing system that is being constructed. The fitting 26 can advantageously be a clean out tee that is positioned between the sewer an the plumbing system that is being constructed. The sealing device 10 is received coaxially in the barrel 24 of the fitting 26, with the angled flange 20 mating with and lying against a bevel in the barrel 24 of the fitting 26. Wax from a wax ring can be wiped on the angled flange 20 to form a water tight seal with the bevel in the barrel 24 of the fitting 26. Alternatively, the angled flange 20 can be lightly glued to the bevel in the barrel 24 of the fitting 26.

Means can be provided for aiding the proper positioning of the sealing device 10 in the fitting 26. The positioning means are provided at the perimeter 18 of the circular disc 12. As shown in FIGS. 1–4, the angled flange 26 is formed integrally with the first surface 14 of the circular disc 12 so as to extend from the first surface 14 at the perimeter 18 of the circular disc 12. In this embodiment, the positioning means comprises the perimeter 18 of the circular disc 12 that extends downwardly from the angled flange 26. In the embodiment shown in FIG. 5, the angled flange 26 is formed integrally with the perimeter 18 of the circular disc 12. The positioning means shown in the embodiment of FIG. 5 comprises at least 3 and preferably 4 projections 44 that extend downwardly from the second surface 16 of the circular disc 12 adjacent to the perimeter 18 of the circular disc 12. The projections 44 are equally spaced from each other.

When the construction of the drain, vent, waste system has been completed and the system is ready for testing, the system is filled with water. The sealing device 10 prevents the water from running into the sewer so that the plumbing system can be filled with water to test the system for leaks. Following the testing of the system, the sealing device 10 is removed so that water can drain from the system and the system can be placed in service. The sealing device 10 of the present invention can quickly be removed in its entirety from the completed plumbing system without any disassembly of the plumbing system.

To remove the sealing disc 10 a force is applied to the lug 30 to break the lug 30 from the circular disc 12. It is convenient to connect a flexible pulling element (not shown in the drawings) to the lug 30. The flexible pulling element is pulled through an open outlet of the fitting 26. An opening 48 can be provided in the lug 30 for attachment of the pulling element. Breaking of the lug 30 from the circular disc 12 is facilitated by the grooves 40 and 42 that pass by the opposite sides 34 of the lug 30 and the common juncture of the grooves 40 and 42 that is positioned adjacent to the chisel point of the forward end 32 of the lug 30. The chisel point of the forward end 32 of the lug 30 acts as fulcrum for the force exerted to the lug 30 and initiates a ripping or tearing action that severs the lug 30 from the circular disc 12. The lug 30 is then pulled in a continuous pulling action so as to rip the circular disc 12 along the grooves 40 and 42 in a generally spiral ripping motion that tears the circular disc 12 into an elongate, spiral strip. The spiral ripping motion along the grooves 40 and 42 continues to the angled flange 20. The angled flange 20 is severed and pulled from the fitting 26 as a continuous elongate extension of the spiral strip formed by the spiral ripping action on the circular disc 12. The entire sealing device 10 is thus readily ripped into an elongate spiral form and pulled out of the fitting 26 through the open outlet of the fitting 26.

For sealing devices 10 that are used in 3 inch and larger fittings, it has been found advantageous, as shown in FIGS. 1–4, for the lug 30 to be spaced inwardly from the circular perimeter 18 of the circular disc 12, with the first groove 40 extending in a smooth curve from near the back end 36 of the lug 30 to the perimeter 18 of the circular disc 12 and then in an arc around the perimeter 18 of the circular disc 12. In this embodiment, the second groove 42 extends in a smooth curve from near the back end 36 of the lug 30 to the arc that is spaced inwardly toward the central portion of the circular disc 12 from the first groove 40.

It is further advantageous for the arc that the first groove 40 makes around the perimeter 18 of the circular disc 12 to have a length of at least one-half of the perimeter 18 of the circular disc 12. The arc that the second groove 42 makes preferably extends at least 180 degrees around a center point of the circular disc 12.

As an aid in ripping and tearing across the angled flange 20 of the sealing device 10, the first and second elongate grooves 40 and 42 are preferably formed in the first surface 14 of the circular disc 12, and a terminal end portion of the first groove 40 extends across an upper surface of the angled flange 20. When the circular disc 12 is ripped in a spiral motion along the grooves 40 and 42, the terminal portion of the first groove 40 that extends across the upper surface of the angled flange 20 facilitates the breaking and ripping of the angled flange 20 along the groove 40 so that the angled flange 20 can be pulled from the fitting 26.

For purposes of aiding in ripping and pulling the portion of the circular disc 12 between the pair of grooves 40 and 42, an elongate rib 50 is advantageously formed to extend from the surface of the circular disc 12 in which the grooves 40 and 42 are formed. Further, the rib 50 is positioned between the first and second grooves 40 and 42, and the rib 50 extends from the back end 36 of the lug 30 along the first groove 40 all the way to the angled flange 20. The rib 50 is then joined to the angled flange 20 adjacent to where the first groove 40 extends across the upper surface of the angled flange 20. The rib 50 is preferably integrally molded to the surface of the circular disc 12 and the angled flange 20. The rib 50 provides rigidity and strength to the strip that is ripped and pulled from between the two grooves 40 and 42 so that the strip is easily severed along the grooves 40 and 42 in a spiral ripping motion to ultimately pull the entire sealing device 10 from the fitting.

For sealing devices 10 that are used in 2.5 inch and smaller fittings, it has been found advantageous, as shown in FIG. 6 for the lug 30 to extend downwardly from the second surface 16 of the circular disc 12, with lug 30 being positioned with its forward, chisel-pointed end located no more than about one-fourth inch from the perimeter 18 of the circular disc. The back end of the lug 30 is positioned inwardly from the perimeter 18 of the circular disc 12 so that a longitudinal axis of the lug 30 that extends through the forward, chisel-pointed end and back end of the lug 30 is displaced by a distance of between about one-eight and one-half inch in its closest distance to a center point of the circular disc 12.

First and second elongate grooves are formed in the first surface of the circular disc 12. The first and second elongate grooves 40 and 42 have a common juncture positioned near the forward, chisel-pointed end of the lug 30, and the grooves 40 and 42 diverge from the common juncture and extending along the opposite sides of the lug 30 to near the back end of the lug 30. The first and second elongate grooves 40 and 42 then further extend from near the back end of the lug 30 so that the first groove 40 curves from the side of the lug 30 that is closest to the center point of the circular disc 12. The first groove 40 curves in a smooth curve around the center point of the circular disc 12 to a point on the perimeter 18 of the circular disc 12. The first groove 40 then extends in an arc along the perimeter 18 of the circular disc 12 adjacent to the angled flange 20 to a position that is no more than about three-fourths of an inch from the forward end of the lug 30. The second groove 42 extends from the side of the lug 30 that is farthest from the center point of the circular disc 12 in a smooth curve that is spaced from the smooth curve of the first groove, with the second groove 42 extending to a point on the perimeter 18 of the circular disc 12. The terminal end portion of the second groove 42 extends across an upper surface of the angled flange 20.

For purposes of aiding in ripping and pulling the portion of the circular disc 12 between the pair of grooves 40 and 42, an elongate rib 50 similar to that of the previously described embodiment of the invention is advantageously formed to extend from the surface of the circular disc 12 in which the grooves 40 and 42 are formed. The rib 50 is positioned between the first and second grooves 40 and 42, but the rib 50 extends from the back end 36 of the lug 30 along the second groove 42 all the way to the angled flange 20. The rib 50 is then joined to the angled flange 20 adjacent to where the second groove 42 extends across the upper surface of the angled flange 20. The rib 50 is preferably integrally molded to the surface of the circular disc 12 and the angled flange 20. The rib 50 provides rigidity and strength to the strip that is ripped and pulled from between the two grooves 40 and 42 so that the strip is easily severed along the grooves 40 and 42 in a spiral ripping motion to ultimately pull the entire sealing device 10 from the fitting.

Although preferred embodiments of the sealing device 10 of the present invention have been illustrated and described, it is to be understood that the present disclosure is made by way of example and that various other embodiments are possible without departing from the subject matter coming within the scope of the following claims, which subject matter is regarded as the invention.

I claim:

1. A disc-shaped sealing device molded as an integral, unitary piece from polymeric material, wherein said sealing device is to be used with a plastic fitting in a drain, vent, waste plumbing system for temporarily sealing said system so that hydraulic testing can be done on the system, said sealing device comprising a circular disc having first and second substantially planar surfaces and a substantially circular perimeter;

an angled flange extending outwardly and upwardly from the perimeter of the first surface of said circular disc, wherein the disc-shaped device fits snugly within a barrel of a plastic fitting such that the circular disc is coaxially received in the barrel of the plastic fitting and the angled flange mates with and lies against a bevel in the barrel of the plastic fitting;

a lug extending downwardly from the second surface of said circular disc, said lug having a forward end, opposite sides and a back end that are joined integrally along mutually respective proximal side edges thereof to said circular disc;

first and second elongate grooves formed in one of the first and second surfaces of said circular disc, said first and second elongate grooves having a common juncture positioned near the forward end of said lug, with said first and second elongate grooves diverging from said common juncture and extending along the opposite sides of said lug to near the back end of said lug, and with said first and second elongate grooves then further extending from near the back end of said lug so that the first groove curves in an arc around the perimeter of said circular disc so as to extend at least partially around the perimeter of said circular disc adjacent to said angled flange, and the second groove extends in an arc that is spaced inwardly toward a central portion of the circular disc from said first groove;

and said first and second grooves provide means for removing the disc-shaped device in its entirety from the barrel by pulling on said lug which causes ripping along said grooves.

2. A disc-shaped sealing device in accordance with claim 1 wherein said lug is spaced inwardly from said circular perimeter of said circular disc;

said first groove extends in a smooth curve from near the back end of said lug to the perimeter of said circular disc and then in said arc around the perimeter of said circular disc; and said second groove extends in a smooth curve from near the back end of said lug to said arc that is spaced inwardly toward the central portion of the circular disc from said first groove.

3. A disc-shaped sealing device in accordance with claim 2 wherein the arc that said first groove makes around the perimeter of said circular disc has a length of at least one-half of the perimeter of said circular disc; and the arc that said second groove makes extends at least 180 degrees around a center point of said circular disc.

4. A disc-shaped sealing device in accordance with claim 3 wherein the first and second elongate grooves are formed in the first surface of said circular disc; and a terminal end portion of said first groove extends across an upper surface of said angled flange.

5. A disc-shaped sealing device in accordance with claim 1 wherein an elongate rib is integrally formed to extend from said one of said first and second surfaces of said circular disc in which the first and second grooves are formed, said elongate rib being positioned between said first and second grooves.

6. A disc-shaped sealing device in accordance with claim 5 wherein the first and second elongate grooves are formed in the first surface of said circular disc;

a terminal end portion of said first groove extends across an upper surface of said angled flange; and said elongate rib extends along said first groove and is integrally joined to said angled flange adjacent to where the first groove extends across the upper surface of said angled flange.

7. A disc-shaped sealing device in accordance with claim 1 wherein said lug has an opening extending through said lug from opposite sides thereof whereby an end of a flexible pulling element can be attached to said lug through said opening.

8. A disc-shaped sealing device in accordance with claim 7 wherein the forward end of said lug is formed by a pair of planar faces that slant forward from the opposite sides of said lug so that the forward end of said lug has the shape of a chisel point.

9. A disc-shaped sealing device in accordance with claim 1 wherein positioning means are provided at the perimeter of the circular disc for positioning the disc-shaped sealing device within the barrel of a plastic fitting.

10. A disc-shaped sealing device in accordance with claim 9 wherein said angled flange is formed integrally with the first surface of said circular disc so as to extend from the first surface of said circular disc at the perimeter of said circular disc; and said positioning means comprises the perimeter of said circular disc that extends downwardly from said angled flange.

11. A disc-shaped sealing device in accordance with claim 9 wherein said angled flange is formed integrally with the perimeter of said circular disc; and said positioning means comprises at least three projections that extend downwardly from the second surface of said circular disc adjacent to the perimeter of said circular disc, with said projections being equally spaced from each other.

12. A disc-shaped sealing device molded as an integral, unitary piece from polymeric material, wherein said sealing device is to be used with a plastic fitting in a drain, vent, waste plumbing system for temporarily sealing said system so that hydraulic testing can be done on the system, said sealing device comprising a circular disc having first and second substantially planar surfaces and a substantially circular perimeter;

an angled flange extending outwardly and upwardly from the perimeter of the first surface of said circular disc, wherein the disc-shaped device fits snugly within a barrel of a plastic fitting such that the circular disc is coaxially received in the barrel of the plastic fitting and the angled flange mates with and lies against a bevel in the barrel of the plastic fitting;

a lug extending downwardly from the second surface of said circular disc, said lug having a forward end, opposite sides and a back end that are joined integrally along mutually respective proximal side edges thereof to said circular disc;

said lug being positioned with its forward end located no more than about one-fourth inch from the perimeter of said circular, disc and with the back end positioned inwardly from the perimeter of said circular disc so that a longitudinal axis of said lug that extends through the forward end and back end of said lug is displaced by a distance of between about one-eight and one-half inch in its closest distance to a center point of said circular disc;

first and second elongate grooves formed in the first surface of said circular disc, said first and second elongate grooves having a common juncture positioned near the front end of said lug, with said first and second elongate grooves diverging from said common juncture and extending along the opposite sides of said lug to near the back end of said lug, and with said first and second elongate grooves then further extending from near the back end of said lug so that the first groove curves from the side of said lug that is closest to the center point of said circular disc, so that said first groove curves in a smooth curve around the center point of said circular disc to a point on the perimeter of said circular disc and then extends in an arc along the perimeter of said circular disc adjacent to said angled flange to a position that is no more than about three-fourths of an inch from the forward end of said lug, and the second groove extends from the side of said lug that is farthest from the center point of said circular disc in a smooth curve that is spaced from the smooth curve of said first groove, with said second groove extending to a point on the perimeter of said circular disc, and further with a terminal end portion of said second groove extending across an upper surface of said angled flange;

and said first and second grooves provide means for removing the disc-shaped device in its entirety from the barrel by pulling on said lug which causes ripping along said grooves.

13. A disc-shaped sealing device in accordance with claim 12 wherein an elongate rib is integrally formed to extend from said first surface of said circular disc, said elongate rib being positioned between said first and second grooves.

14. A disc-shaped sealing device in accordance with claim 13 wherein said elongate rib extends along said second groove and is integrally joined to said angled flange adjacent to where said second groove extends across the upper surface of said angled flange.

15. A disc-shaped sealing device in accordance with claim 12 wherein said lug has an opening extending through said lug from opposite sides thereof whereby an end of a flexible pulling element can be attached to said lug through said opening.

16. A disc-shaped sealing device in accordance with claim 15 wherein the opposite sides of said lug slant toward the forward end of said lug so that the forward end of said lug has the shape of a chisel point.

17. A disc-shaped sealing device in accordance with claim 12 wherein positioning means are provided at the perimeter of the circular disc for positioning the disc-shaped sealing device within the barrel of a plastic fitting.

18. A disc-shaped sealing device in accordance with claim 17 wherein said angled flange is formed integrally with the first surface of said circular disc so as to extend from the first surface of said circular disc at the perimeter of said circular disc; and said positioning means comprises the perimeter of said circular disc that extends downwardly from said angled flange.

19. A disc-shaped sealing device in accordance with claim 17 wherein said angled flange is formed integrally with the perimeter of said circular disc; and said positioning means comprises at least three projections that extend downwardly from the second surface of said circular disc adjacent to the perimeter of said circular disc, with said projections being equally spaced from each other.

20. A method of hydraulically testing a drain, vent, waste plumbing system comprising the steps of (a) installing a disc-shaped sealing device in a barrel of a plastic fitting, said sealing device comprising a circular disc having a periphery that is circumscribed by an angled flange, with said sealing device being positioned so that the circular disc is received coaxially in said barrel and the flange mates with and lies against a bevel in said barrel;

(b) installing the plastic fitting into the drain, vent, waste plumbing system;

(c) filling the drain, vent, waste plumbing system upstream of the plastic fitting with water to hydraulically test the drain, vent, waste plumbing system;

(d) pulling a lug on the circular disc of said sealing device to tear the lug from the circular disc and rip the circular disc in a generally spiral ripping motion to tear the circular disc into an elongate, substantially spiral strip; and (3) continuing to pull the lug and the spiral strip to sever the angle flange and pull the angled flange from the fitting as a continuous elongate extension of the spiral strip.

* * * * *